Feb. 28, 1939.  A. W. SPAULDING  2,148,783
EXPANDING RING FOR TUNNEL LININGS
Filed Dec. 2, 1936  2 Sheets-Sheet 1
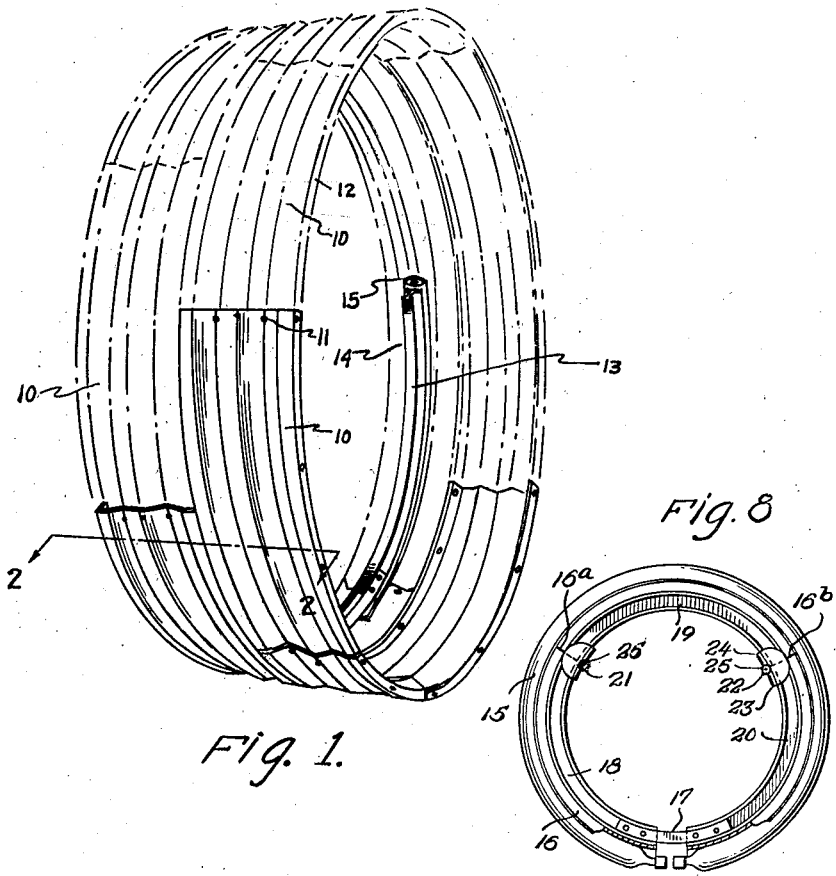
Fig. 1.
Fig. 8.
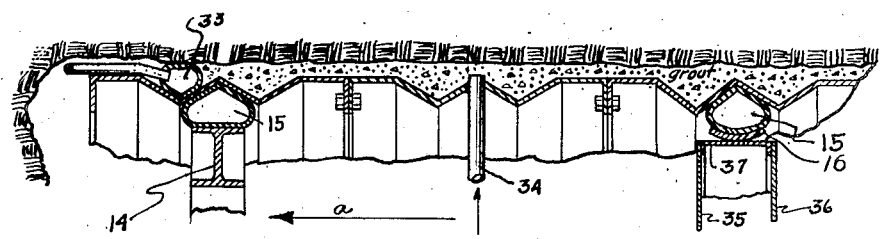
Fig. 2.
INVENTOR
ARCH W. SPAULDING.
BY Allen & Allen
ATTORNEYS.

Feb. 28, 1939.  A. W. SPAULDING  2,148,783
EXPANDING RING FOR TUNNEL LININGS
Filed Dec. 2, 1936    2 Sheets-Sheet 2
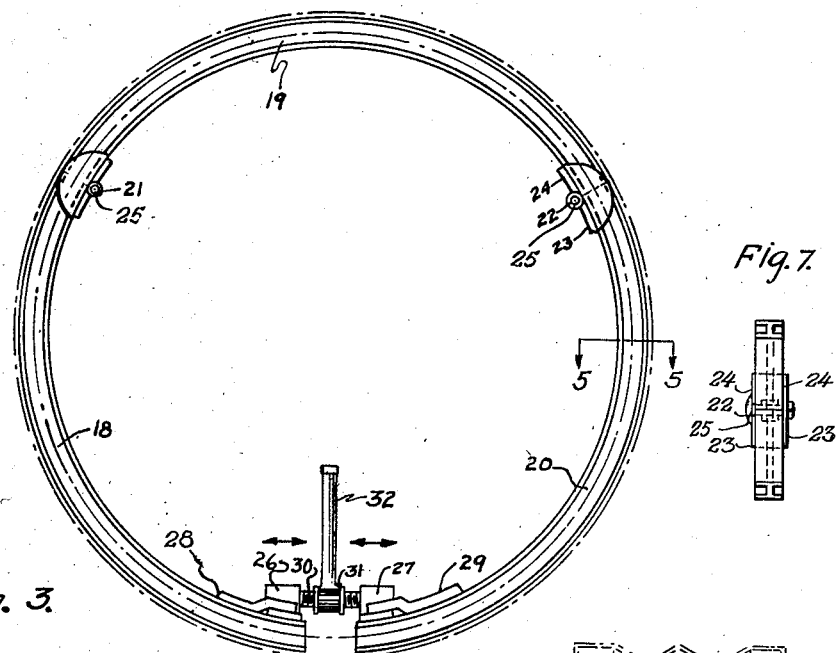
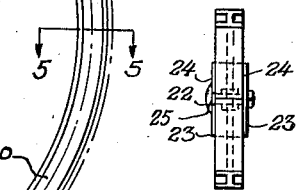
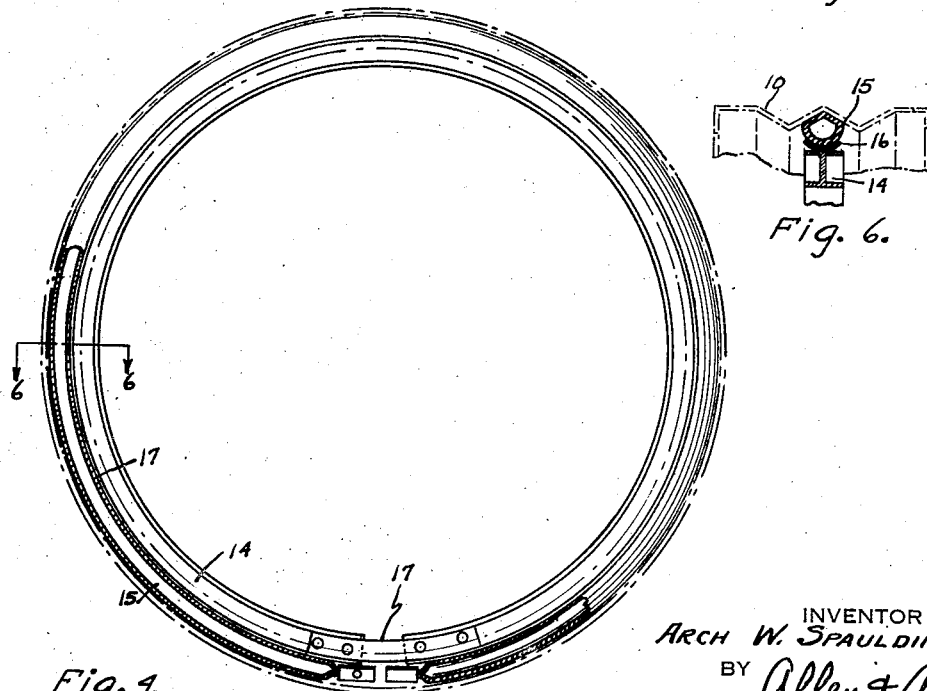
INVENTOR
ARCH W. SPAULDING.
BY Allen & Allen
ATTORNEYS.

Patented Feb. 28, 1939

2,148,783

UNITED STATES PATENT OFFICE 2,148,783

EXPANDING RING FOR TUNNEL LININGS

Arch W. Spaulding, Middletown, Ohio, assignor to The American Rolling Mill Company, Middletown, Ohio, a corporation of Ohio Application December 2, 1936, Serial No. 113,868

7 Claims. (Cl. 61—45)

This invention relates generally to the art of tunneling and tunnel lining and more particularly it relates to certain apparatus which is advantageous in the lining of tunnels. The invention is particularly useful when used in connection with tunnel liners, such as are described and claimed in Patent 2,062,706, issued December 1, 1936, in the names of Jonathan Roy Freeze and Arch W. Spaulding.

In the boring of circular tunnels, it is often necessary and usually desirable to line the tunnel with some sort of lining structure so as to prevent caving in and make for free clearance through the tunnel. Tunnel liners as described in the above-mentioned patent are formed from plate sections. A number of sections, for example four, are bolted together to form a ring or assembly of sections and a number of such assembled rings succeed each other along the direction of the tunnel. The loose earth, rocks, shale and the like which are always present in the construction of tunnels and if the tunnel is being bored with a close clearance (clearance between the tunnel liner proper and the outside earth or rock wall) it is extremely difficult to assemble the tunnel liner plates inside of the tunnel. Furthermore, the plate sections of the liner are usually formed slightly under the proper radius of curvature so that they must be expanded in order to align the bolt holes properly.

In the light of the above discussion, it is an object of my invention to provide a device for expanding an incompletely assembled tunnel lining assembly so that the final bolting together may be easily accomplished. It is another object of my invention to provide a support for jacking devices used in the boring of tunnels. It is another object of my invention to provide a novel and simple bulkhead device for tunneling purposes. There are also certain novel process aspects of my invention and these and other objects of my invention will be pointed out in more detail hereinafter, or will be apparent to one skilled in the art upon reading these specifications. I accomplish these objects by that construction and arrangement of parts and by that method of which I shall now describe exemplary embodiments.

Reference is now made to the drawings which form a part hereof, and in which,

Figure 1 is a perspective view of two assemblies of lining sections showing the expanding ring therein.

Fig. 2 is a partial section showing several tunnel lining plates in position within the tunnel and showing the use of the expanding ring.

Fig. 3 is an elevational view of a simple mechanically operated ring which may be used for other purposes.

Fig. 4 is an elevational view of the expanding ring shown in Fig. 1.

Fig. 5 is a section taken on the line 5—5 of Fig. 3.

Fig. 6 is a section taken on the line 6—6 of Fig. 4 and,

Fig. 7 is a partial side view of the hinge of the ring shown in Fig. 3.

Fig. 8 is an elevational view of an expanding ring embodying certain of the features of the rings of Figs. 3 and 4.

I have shown my invention in connection with the tunnel lining plates indicated at 10 in Fig. 1. The plates 10 are bolted together as indicated at 11 in overlapping relation to form a ring. These plate sections are provided with flanges 12 by which successive rings are bolted together. It is a simple matter to bolt together all the individual plates in a ring, but it is often difficult to bolt together the two opposite ends of the ring, to complete the lining structure. For this purpose, I have provided an expanding ring indicated generally at 13, comprising for example, an I-beam member 14 formed to a circular shape. About the periphery of the ring 13, I place a section of fire hose or the like, indicated at 15. As shown in Fig. 6, the flexible tube 15 may advantageously rest in a saddle member 16 which may be welded to the I-beam section 14. The expanding ring is placed inside the lining structure and pressure is admitted to the flexible tube 15 which immediately expands on the same principle that is used in the well known Bourdon gauge. This expansion forces the liner plates outwardly until the bolt holes come into registry, whereupon the assembly of the sections may be completed.

By means of the construction indicated generally at 17, the ring may be slightly contracted for the purpose of moving it from place to place and also to adapt it to tunnels of slightly varying dimensions.

In Fig. 3 I have shown a slightly simplified expanding ring which comprises three I-beam sections indicated at 18, 19 and 20. The members 18 and 20 are hinged to opposite ends of the member 19 as at 21 and 22. These hinges may, for example, comprise shoes 23 and 24 welded respectively to the adjacent ends of the I-beam sections and having bosses provided with openings for the pintle 25. The construction of the hinges is, of course, no limitation upon my invention and other forms of hinges may be used just as well. For the purpose of expanding and contracting this ring, I have provided the bosses 26 and 27, welded to the supporting plates 28 and 29, which are themselves welded to the I-beam sections. The bosses 26 and 27 are provided with aligned, oppositely threaded openings to cooperate with the jack screws 30, which is oppositely threaded on each side of its center. Any desired ratchet mechanism or the like, indicated generally at 31 and leverage handle 32 may be provided for actuating the jack screw.

In Fig. 8 I have shown a slightly modified expanding ring which embodies certain of the features of the rings shown in Figs. 3 and 4. In this ring I have again provided three sections 18, 19 and 20, hinged together at 21 and 22 as in the ring of Fig. 3. The ends of the members 18 and 20 are connected at 17 similarly to the construction shown in Fig. 4. This ring is provided with a saddle member 16 similarly to the ring of Fig. 4, except that the saddle member is broken in two places as shown at 16a and 16b, to permit of collapsing the ring at the hinged points. As in the ring of Fig. 4, a piece of fire hose or the like 15 rests in the saddle member 16. This ring of Fig. 8 is of course, adaptable to all the uses discussed in connection with the rings of Figs. 3 and 4.

The manner in which the rings of Figs. 3 and 4 cooperate with the tunnel lining plates is shown in the detailed drawings of Figs. 5 and 6. The ring of Fig. 3 is advantageous as a backstop for jacking a shield forward in tunneling. This ring, when expanded, locks into the corrugations of the lining structure and forms a ring inside of the liner with sufficient strength to withstand pressure applied horizontally against it from jacks or other devices. Thus the load from the jacks is uniformly distributed around the periphery of the tunnel liner. Often in tunneling, it is necessary to jack a shield forward for a distance as great as 1000 feet. The device of Fig. 3 greatly simplifies this procedure since it is a very rapid operation to contract the ring, move it forwardly a desired distance and again expand it into operative relation with the lining structure. In Fig. 2, I have shown how a tunnel may be drilled using my novel expanding ring. The tunnel is being bored in the direction of the arrow *a*. The expanding ring is shown at 14 and I have shown at 33 another piece of flexible tubing such as fire hose, disposed around the outside of the lining structure. Thus when the fluid under pressure is admitted to the elements 15 and 33, the lining structure is expanded by means of the member 15 and the annular space to the rear of the element 33 is effectively sealed off. A concrete grouting or the like, may be used in back filling around the periphery of the lining structure and this material may be forced into the annular space through a pipe 34, through a hole in the lining structure. When the back filling operation is completed the tunnel may be drilled further, additional lining plates assembled with the use of the expanding ring as before, new seal may be provided and the back filling continued. These operations are repeated to the end of the tunnel.

If, as is often necessary in tunneling work, a bulkhead must be provided so that a certain air pressure may be maintained within the tunnel, this may easily be done by providing a bulkhead member composed of plate members 35 and 36 connected by a channel member 37 and having welded onto the channel a saddle 16. Again a flexible tube, such as fire hose at 15, rests in the saddle and seals the annular space around the bulkhead. This bulkhead has the advantage of being readily movable from one point to another and provides a substantially tight seal.

It is to be understood that different forms of my invention may be made without departing from the spirit thereof and that the two forms of expanding rings may be used interchangeably under proper conditions. I therefore, do not intend to limit myself other than as expressed in the claims which follow.

Having now described my invention, what I claim as new and desire to protect by Letters Patent is:

1. That process of tunneling which includes the steps of boring a hole slightly larger than the required finished size of the tunnel, assembling a lining structure and forcing it to circular form within the tunnel, sealing the annular space about said lining near the advance end of the tunnel, and forcing a grouting into the annular space to the rear of the seal so formed.

2. An expanding ring for tunnel liners, comprising a structural iron member formed into a circle and having about its periphery a saddle member, and an inflatable tube mounted in said saddle member and passing around the periphery of said ring.

3. An expanding ring for tunnel liners, comprising a structural iron member formed into a circle and provided with a hinge for collapsing purposes, said ring having about its periphery a saddle member, and an inflatable tube mounted in said saddle member and passing around the periphery of said ring.

4. A portable bulkhead for tunneling purposes, comprising a wall member of circular form, a saddle member about the periphery of said member, and an inflatable tube seated in said saddle.

5. A method of supporting jacks in tunnels lined with corrugated sheet metal, which includes the steps of providing a structural iron member formed into an incomplete circle, having a hinge, and mechanism bridging the incomplete portion of said circle for expanding and contracting the same, placing said ring in a corrugation in said lining and expanding said member to cause it to seat solidly in said corrugation.

6. The combination for the purposes described, of a circular assembly of tunnel liner plates, said assembly having corrugations extending radially around said assembly, and an expanding ring comprising a rigid structural iron member formed into a circle and carrying around its periphery an inflatable tube, said tube seating in one of said corrugations.

7. The combination for the purposes described, of a circular assembly of tunnel liner plates, said assembly having corrugations extending radially around said assembly, and an expanding ring comprising a structural iron member formed into an incomplete circle and provided with expanding means, said ring being seated in one of said corrugations.

ARCH W. SPAULDING.